United States Patent [19]

Vickery

[11] 3,847,634

[45] Nov. 12, 1974

[54] SYNTHETIC LIGHTWEIGHT BUILDING MATERIAL

[76] Inventor: Ronald C. Vickery, 410 S. Main St., Hudson, Fla. 33568

[22] Filed: Mar. 12, 1973

[21] Appl. No.: 340,182

[52] U.S. Cl.................................. 106/109, 106/110
[51] Int. Cl............................................. C04b 11/00
[58] Field of Search.......................... 106/109, 110

[56] References Cited
UNITED STATES PATENTS

| 1,953,075 | 4/1934 | Collins............................. 22/188 X |
| 2,785,988 | 3/1957 | Lipkind et al. ..................... 106/109 |
| 2,791,511 | 5/1957 | Lipkind et al. ..................... 106/109 |
| 3,042,537 | 7/1962 | Newell et al........................ 106/110 |

FOREIGN PATENTS OR APPLICATIONS

| 1,156,348 | 10/1963 | Germany ............................ 106/110 |
| 1,224,190 | 9/1966 | Germany ............................ 106/109 |

*Primary Examiner*—J. Poer
*Assistant Examiner*—John P. Sheehan
*Attorney, Agent, or Firm*—Brown, Murray, Flick & Peckham

[57] ABSTRACT

A synthetic lightweight building material suitable for use as aggregate, building blocks, bricks, facing masonry such as tile, and lightweight decorative stone, is prepared by mixing gypsum by-products from phosphoric or hydrofluoric acid manufacture containing traces of impurities with lime and a soluble silicate with sufficient water to form a slurry which is then molded and allowed to set to form such concrete structures or, if desired, crushed into rock aggregate for the manufacture of such structures. The slurry contains a mixture by weight of solids of 2 to 10 percent lime and 1 to 25 percent silica, the latter being in the form of either a soluble silica powder or a colloidal dispersion of silica sol with sufficient water to form the slurry. The remainder of the mixture comprising, as an essential constituent, calcium sulfate provided by the gypsum by-product.

10 Claims, No Drawings

3,847,634

SYNTHETIC LIGHTWEIGHT BUILDING MATERIAL

BACKGROUND OF THE INVENTION

The present invention relates to economic use of gypsum-type residues for building products, and more particularly to a novel composition of these residues whereby their use in structures imparts a lightness and fire-resistance superior to natural or heretofore artificially manufactured products of a similar nature.

Concrete for construction purposes consists in its customary use of Portland cement, sand and aggregate in varying ratios. Aggregate, in this sense, comprises crushed rock or stone which is usually of limestone origin and ranging in size from ⅛ inch to 2 inch general dimension. These mixtures of cement, sand and aggregate are well known and have been used for many years. However, supplies of rock suitable for use as aggregate are dwindling rapidly, particularly in view of today's growing building economy. Therefore, it would be useful if a suitable substitute for the geological available material could be found or manufactured. Moreover, it would be beneficial if such material had other desirable properties such as lightness and high resistance to heat, thereby providing a significant novel factor which could be introduced into the building material field.

There does exist a manufactured building material known as "Solite" (Trademark) which can be and is being used adequately as an aggregate material. Solite is prepared by a sintering process involving considerable technological skill, and the process operation does present the possibility of creating an atmospheric pollution hazard. I have discovered a material which can be easily manufactured that possesses use-properties superior to Solite and, indeed, even to natural limestone aggregate while at the same time eliminating ecological and esthetic by-product problems.

Incident to the manufacture of phosphate fertilizers, phosphoric acid, etc., such as that disclosed in my prior U.S. Pat. Nos. 2,885,266; 2,899,292 and 2,914,380, calcium phosphate rock is treated with sulfuric acid to yield phosphoric acid and calcium sulfate. This by-product calcium sulfate material has found little or no commercial use because of residual impurities, such as aluminum and/or fluorine which appear to preclude its use in many applications. A similar situation occurs in the manufacture of hydrofluoric acid from fluorine and sulfuric acid out of which calcium sulfate is again left as a residue for which no real use has been found. These phosphogypsum and fluorogypsum residue products accumulate in massive quantities at a rate of millions of tons per year. These residues are accumulated in the form of massive mounds or hillocks which have a negative esthetic value and occasionally produce an appreciable hydrogeological problem that must be dealt with at industries' and ultimately consumers' expense.

I have discovered an economical use for the above-described gypsum-type residues in a process whereby they can be readily converted into a usable building product in the form of building blocks, bricks, masonry for facing structures, tile, aggregate and the like which exhibit a strength comparable to natural stone while their use imparts to a structure a lightness and fire-resistance which is superior to natural or artificially manufactured building products that are thereby replaced.

The residual gypsum product from the manufacture of phosphoric acid and hydrofluoric acid is similar in chemical composition to $CaSO_4.2H_2O$ (calcium sulfate) which can be dehydrated to a hemihydrate state with the chemical composition of $CaSO_4.1/2H_2O$. The dehydrated calcium sulfate after disintegration, when mixed with water, will then set and hydrate as does plaster of Paris. However, because of the natural impurities in these gypsum-type by-products, the set hydrate is much weaker than commercial plaster of Paris and cannot be used as a substitute therefor. I have found that the impurities which negate the use of the gypsum by-product as plaster do not interfere and, in fact, are believed to provide a probable assistance to the building material composition according to this invention.

SUMMARY OF THE INVENTION

It is an object of this invention to provide a composition for an improved building material through the economical use of residual gypsum by-products of the manufacture of phosphoric acid and hydrofluoric acid.

It is a further object of the present invention to provide an improved building material composition which is lightweight and exhibits a superior fire-resistance characteristic over natural or known artificially manufactured similar products.

According to the present invention, a residual gypsum by-product from phosphoric acid or hydrofluoric acid manufacture is dehydrated at a temperature not exceeding 150°C and then mixed with a small amount of lime. Sodium silicate in either powder form or as a colloidal dispersion is then added to this mixture with sufficient quantities of water to form a slurry which is then molded into decorative building materials or products which are broken into aggregate of a size useful for the formation of a building material. The silicate ingredient may be of an alkali metal such as sodium or potassium, or it may be in the form of a stabilized silica sol. The slurried mixture attains an initial hydraulic set through the hydration of the lime and the dehydrated gypsum. Thereafter, a chemical reaction takes place between the silicate and the solids forming, in situ, a mass of tightly fibrous crystals which have been identified microscopically as calcium silicate. It appears most probable from the data obtained and displayed in the following examples that trace elements present in the gypsum by-products catalyze or initiate the room temperature formation of the calcium silicate. Such a reaction normally requires considerable heat or a prolonged period of reaction. The nature of the bonding reaction developed is believed to involve partial solution of the calcium sulfate in the calcium hydroxide solution formed from lime and then reaction of this complex solution with the solubilized silicate. Subsidiary experiments have shown that the solubility of calcium sulfate in calcium hydroxide solution is on the order of 5 percent. It must be emphasized, however, that the full nature of all the reactions involved are not precisely known at this time. However, I have found that the probable composition and structure of the binding crystal matrix is similar to that of thaumassite ($CaSiO_3.CaCO_3.CaSO_4.15H_2O$) and xonotlite ($5CaSiO_3.H_2O$). I have discovered that the silicate ingredient may be added as an aqueous colloidal sol containing 30 to 40%

SiO$_2$ with 0.5% Na$_2$O as a stabilizer. An aqueous colloidal sol containing as low as 5% SiO$_2$ has been used successfully. In place of an aqueous colloidal sol, dry soluble silicate powder may be used in the aforementioned mixture. This silicate powder has been used in the form of a nearly anhydrous, slowly soluble, powdered sodium silicate ground so that more than 95 percent passes 65 mesh. The powder contained 23.1% Na$_2$O, 74.4 percent SiO$_2$ and 1.5% H$_2$O.

cent colloidal dispersion of sodium silicate. The mass was allowed to harden and set for several days. The product had only 1,500 pounds per square inch compressive strength.

EXAMPLE VI

Example II was repeated with different concentrations of silica colloidal dispersion containing from 40 to 5 percent by weight SiO$_2$. Results obtained were as follows:

| % SiO$_2$ in sol | % of SiO$_2$ in mixture | % of lime in mixture | Strength | Calcium Silicate Present |
|---|---|---|---|---|
| 40 | 9.49 | 3.9 | 5000 pounds per square inch | yes |
| 30 | 7.25 | 4 | 5000 pounds per square inch | yes |
| 20 | 4.95 | 4.8 | 4000 pounds per square inch | yes |
| 10 | 2.54 | 4.25 | 4000 pounds per square inch | yes |
| 5 | 1.29 | 4.3 | 3000 pounds per square inch | yes |

Having described the basic aspects of the present invention, the following examples are given to illustrate embodiments thereof:

EXAMPLE I 110 grams of phosphogypsum, dehydrated at 120°C for 2 hours, were mixed with 12 grams silica in the form of 30 grams of 40 percent colloidal silica sol to provide 9.1% SiO$_2$ by weight in the mixture. A thick slurry was formed which was hand-pressed into molds and allowed to set for 72 hours or more. The final mass had a compressive strength approaching 1,500 pounds per square inch and a density of 1.6. Microscopic examination did not demonstrate the appearance of calcium silicate crystals.

EXAMPLE II

The composition of Example I was repeated with the addition of 5 grams of lime. This mixture contained 3.94 percent lime and 9.45% SiO$_2$. In the final mass, an interconnecting fibrous mass of calcium silicate crystals was found bonding the particles, and the product had a compressive strength of 5,000 pounds per square inch with a density of 1.6.

EXAMPLE III 100 grams dehydrated phosphogypsum were mixed with 131 grams of an aqueous 40 percent silica colloidal sol to form a slurry which was compressed into molds and allowed to harden for 72 hours. Compressive strength of the mass again was about 1500 pounds per square inch.

EXAMPLE IV

Example III was repeated with the addition of 2 grams of lime, thus forming a mixture containing approximately 345 SiO$_2$ and 1.3 percent lime. After reaction and settling, calcium silicate crystals were observed through the whole mass whose compressive strength was 4,500 pounds per square inch.

EXAMPLE V

Natural gypsum was dehydrated at 125°C and 100 grams were mixed with 8 grams of lime and a 25 per-

EXAMPLE VII 90 grams dehydrated phosphogypsum and 10 grams lime were slurried with 25 percent silicate colloidal dispersion and allowed to set. A well-bonded mass was obtained of compressive strength 4,000 pounds per square inch and a density of 1.6. Calcium silicate crystals permeated the whole mass.

EXAMPLE VIII 90 grams dehydrated phosphogypsum were mixed with 10 grams lime, and the mass reacted with 25 cc of 12-½% SiO$_2$ colloidal dispersion. This mixture included approximately 4% SiO$_2$ and about 10 percent lime and was allowed to set and harden for several days. Gross development of calcium silicate crystals was observed, and the mass had a compressive strength of 4,000 pounds per square inch.

EXAMPLE IX 100 grams of lime were slurried with 30 cc of 25% SiO$_2$ colloidal dispersion. The mass immediately heated up and became hard and granular. Compression into molds was effected with difficulty, but after setting in this manner for 72 hours, the set mass was friable and had a compressive strength of only 200 pounds per square inch. No calcium silicate crystals were observed in the matrix.

EXAMPLE X

Material obtained from Example II was utilized in the formation of concrete blocks. Ratios used were 1 Portland cement, 3 sand and 1 aggregate. The mixed mass was slurried with water in the appropriate proportion and allowed to set. Compressive strength of the final concrete mass was 1500 pounds per square inch as compared with 1200 pounds per square inch when the artificial aggregate was replaced with normal rock aggregate of the same particle size. Density of the finished product was 2.8 which is comparable with a density of 4.0 for the normal material.

EXAMPLE XI

Aggregate material obtained as in Example VIII was prepared in concrete block form using the proportions indicated in Example X. Final compressive strength of the concrete obtained was 1,600 pounds per square inch, and the density of the block was 2.7.

R. H. Smith (J. Amer. Conc. Inst. 10 625 – 9 1972) has shown that cement blocks made with phosphogypsum aggregate clinkers have five times the resistance to heat of normal cement blocks. Although in this instance, the aggregate was a sintered clinker, it is reasonable to assume that the heat-resistance was attributable to the gypsum material present and, as such, this property will extend to the case of the hydrologically formed aggregate.

EXAMPLE XII 98 grams phosphogypsum, previously dehydrated at 150°C were dry-mixed with 2 grams lime and 1.5 grams (approximately) powdered $SiO_2$. The dry solids had the proportion by weight of 1.48% $SiO_2$, 1.97 percent lime and the remaining 96.5 percent of solids essentially consisting of phosphogypsum. These dry solids were then slurried with 40 milliliters of water. The resultant mass was hand-pressed and vibrated into molds and allowed to set for 30 minutes. The blocks were then removed from the molds and allowed to mature for 1 week, whereupon their compressive strength was in excess of 3,000 pounds per square inch, and the mass was hard and permeated by lath-like crystals of the probable nature of thaumassite and xonotlite as indicated above.

In view of the foregoing examples and in order to maintain the desired properties of the synthetic lightweight building material, the percentage of $SiO_2$ by weight is between 1 percent and 25 percent while the preferred range is 1 to 10 percent with optimum results obtained within a range of 2 to 6 percent. The material strength is appreciably affected by the weight percent of the $SiO_2$ ingredient and the $CaO:SiO_2$ ratio.

Although the invention has been shown in connection with certain specific embodiments, it will be readily apparent to those skilled in the art that various changes in composition can be made without departing from the spirit and scope of the invention.

I claim as my invention:

1. A synthetic lightweight building material composition having a compressive strength of about 3,000 to 5,000 pounds per square inch consisting essentially of 1 to 25 percent by weight particulate siliceous material and 2 to 10 percent by weight lime, the remainder comprising a gypsum-type residue selected from a group consisting of phosphogypsum and fluorogypsum, said residue containing as an essential constituent calcium sulfate, said composition being combined with sufficient water to form a slurry wherein the silica constituent of said siliceous material reacts to form complex calcium silicates for producing calcium silicate crystals which act as a binder upon obtaining a hydraulic set.

2. The material composition according to claim 1 wherein said gypsum-type residues include one or more impurities from a group consisting of aluminum and fluorine.

3. The material composition according to claim 2 wherein said gypsum-type residue is dehydrated at at least 120°C for at least 2 hours.

4. The material composition according to claim 2 wherein said particulate siliceous material is combined in the form of an aqueous colloidal dispersion of silicate.

5. The material composition according to claim 2 wherein said particulate siliceous material is combined in the form of dry silicate powder having a particulate size of 65 mesh or smaller.

6. The material composition according to claim 1 wherein said calcium silicate crystals have a matrix form similar to that of thaumassite and xonotlite.

7. The material composition according to claim 1 consisting essentially of 1 to 10 percent by weight of said siliceous material.

8. The material composition according to claim 7 consisting essentially of 3 to 5 percent by weight of said lime.

9. The material composition according to claim 8 consisting essentially of 2 to 7 percent by weight of said siliceous material.

10. The material composition according to claim 1 wherein said slurry upon obtaining a hydraulic set has a density of 1.6 and provides said compressive strength within the range of 3,000 to 5,000 pounds per square inch.

* * * * *